3,125,595
PROCESS FOR REMOVING IRON CONTAMINANTS FROM COBALT OXO CATALYST
William T. Brady, Austin, and Ben R. Hauk, Longview, Tex., assignors to Eastman Kodak Company, Rochester, N.Y., a corporation of New Jersey
No Drawing. Filed Nov. 21, 1958, Ser. No. 775,337
6 Claims. (Cl. 260—465.1)

This invention relates to the production of aldehydes by the addition of carbon monoxide and hydrogen to olefinic compounds. In a specific aspect this invention relates to a process for removing contaminating iron from a cobalt catalyst for use in an oxo reaction. In a more specific aspect this invention relates to a process for maintaining a cobalt hydroformylation catalyst at a high activity while producing hydroformylation products having a low color content.

The addition of hydrogen and carbon monoxide to olefinic compounds is well known as the "oxo reaction." However, the reaction is more properly called a hydroformylation reaction since it involves essentially the addition of a hydrogen atom and a formyl group to the double bond of the olefinic compound in accordance with the following equation:

$$RCH=CH_2 + CO + H_2 \rightarrow RCH_2CH_2CHO$$

In early applications of this reaction a finely divided active cobalt metal prepared in much the same manner that a cobalt hydrogenation catalyst is made was used as the hydroformylation catalyst. It was later found that cobalt carbonyl which is formed quite readily by the reaction of carbon monoxide on an active metallic cobalt catalyst is an active ingredient in the hydroformylation reaction. The cobalt carbonyl can be in the form of cobalt tetracarbonyl, and it is sometimes believed to be in a dimeric form more properly called dicobalt octacarbonyl. It is not essential that all the cobalt in the hydroformylation catalyst be in the form of the tetra- or octacarbonyl. However, in most instances the cobalt hydroformylation catalyst will contain at least 10 mole percent of cobalt carbonyl. The cobalt in the catalyst not in the form of the carbonyl can be in the form of a cobalt salt such as cobalt acetate, cobalt chloride, cobalt sulfate and other salts of organic and nonoxidizing inorganic acids as well as the hydrates of these salts and cobalt oxide.

The hydroformylation reaction has been applied to a wide variety of olefinic compounds including hydrocarbons, alcohols, esters, ethers, acetals, nitriles and the like. This invention is, of course, applicable to any of the olefinic compounds that can be employed in the hydroformylation reaction. In general, olefinic compounds with functional groups can be hydroformylated provided the functional groups do not react with the catalyst in such a manner as to nullify the action of the catalyst. Also the olefinic compound should not become activated by the entering formyl group so that it has a deleterious action on the catalyst. Obviously, a functional group which reacts with aldehydes will lead to secondary products after the initial hydroformylation reaction.

When an oxo reaction is conducted commercially for the production of aldehyde derivatives of the olefinic feed material, it is quite common to employ a considerable amount of steel equipment for the reaction and processing operations. It has been found that over a lengthy period of commercial operation the cobalt hydroformylation catalyst tends to become contaminated by iron from the steel equipment and the contaminating iron has a highly deleterious effect upon the process. For example, the presence of the iron has been found to impart a considerable color to the finished product, and in many instances this color is undesirable and difficult to remove. It has also been found that the presence of the iron in the oxo system tends to lower the activity of the cobalt catalyst and consequently the production of the desired aldehyde products per unit of catalyst is decreased. Furthermore, in the past, it was felt that a cobalt catalyst contaminated with iron was of little, if any, value since there was no economical method for recovering the cobalt commercially and in many instances the contaminated cobalt catalyst was discarded resulting in a substantial increase in production costs.

It is an object of this invention to improve the oxo reaction in such a manner that the activity of the cobalt catalyst is maintained at a high level and the color of the product is maintained at a low level. It is another object of this invention to provide a novel and economical process for separating contaminating iron from a cobalt hydroformylation catalyst. It is another object of this invention to provide a novel and economical process for separating contaminating iron from a cobalt hydroformylation catalyst. It is another object of this invention to provide a novel and economical means for recovering cobalt from an iron-contaminated hydroformylation catalyst in such a manner that the cobalt can be reused in a hydroformylation reaction. It is a further object of this invention to provide a means for avoiding the discarding of iron-contaminated hydroformylation catalysts when the activity of those catalysts reaches the level where, in the past, they were regarded as useless. Further and additional objects of this invention will be quite apparent from the detailed disclosure hereinbelow.

In accordance with this invention it has been found that iron impurities in an iron-contaminated cobalt hydroformylation catalyst can be readily removed in an economical and novel manner by digesting the iron-contaminated cobalt catalyst in nitric acid. During the digestion the iron and cobalt are converted to the corresponding nitrates and, when the pH of the resulting solution is raised substantially but not above 5.4 by addition of a basic compound, the iron precipitates in the form of the hydroxide or basic nitrate. The cobalt in the form of the nitrate remains dissolved in the nitric acid solution, and it is readily separable from the precipitated iron compound. After separation, the pH of the cobalt-containing solution is substantially increased by addition of further amounts of a basic compound and the cobalt nitrate precipitates and is readily recoverable. The recovered cobalt can then be reemployed in the oxo reaction.

During the digestion of the iron-contaminated cobalt catalyst in nitric acid the iron and cobalt are converted to their nitrates in accordance with the following equations:

$$Fe + 6HNO_3 \rightarrow Fe(NO_3)_3 + 3NO_2 + 3H_2O$$
$$Co + 4HNO_3 \rightarrow Co(NO_3)_2 + 2NO_2 + 2H_2O$$

During the digestion it is necessary to employ an amount of nitric acid which is at least sufficient to react with the iron and cobalt to form the corresponding nitrates. The digestion is carried out for a period of about 0.5–5 hours, preferably from 1–2 hours, at a temperature within the range of about 50–100° C., preferably 80–90° C. After the desired digestion has taken place, the pH of the nitric acid solution is substantially increased by addition of a sufficient quantity of a basic compound to effect precipitation of the iron salt. It is quite important to effect this precipitation at a pH not above 5.4 and for optimum results the pH of the precipitating solution is within the range of 2.8–3.2. Within this pH range the precipitating iron salt can contain from about 1–4% cobalt. If the pH is permitted to rise further but not above 5.4, the precipitating iron salt can in some instances contain as high as 12% cobalt. Nevertheless, during this precipitation a substantial amount of the contaminating iron is separated from the cobalt.

The cobalt which remains in solution can be readily separated from the precipitated iron salt by any suitable means, for example, by decantation, centrifuging, filtration and the like. It is preferred to carry out the separation by filtration and for rapid and easy filtration the solution and precipitate to be filtered are maintained at a temperature of about 80–100° C.

During the digestion of the iron-contaminated cobalt catalyst in nitric acid the nitric acid serves to dissolve the cobalt and iron and to oxidize the iron to the ferric state. When the pH of the solution is raised to a level up to 5.4, the iron salt can undergo further reaction in accordance with the equation:

$$Fe(NO_3)_3 + H_2O \rightarrow Fe(NO_3)_2OH + HNO_3$$

The hydroxide or basic nitrate readily precipitates at the proper pH level, and for this pH adjustment any basic compound can be used satisfactorily. Thus, carbonates and hydroxides such as the alkali metal and alkaline earth metal carbonates and hydroxides can be used for pH adjustment. For economical as well as handling reasons it is preferred to employ sodium carbonate for adjustment of the pH of the nitric acid solution after digestion. The amount of sodium carbonate that is employed is an amount sufficient to raise the pH level of the nitric acid solution to the desired range. When the pH is maintained at 5.4 or lower, the iron is readily precipitated while the cobalt remains in solution.

After the precipitated iron compound has been separated from the soluble cobalt salt, the residue or filter cake can be washed free of soluble cobalt with warm water. The washing is preferably carried out at a temperature of 80–90° C. for rapid and easy filtration. The soluble cobalt in the filtrate can then be precipitated by raising the pH level of the filtrate by addition of further quantities of the basic compound used for pH adjustment. Any of the basic compounds named above can be used for this pH adjustment, but it is preferred to employ sodium carbonate for this purpose. At the proper pH level the cobalt salt undergoes reaction as shown by the following equation:

$$Co(NO_3)_2 + Na_2CO_3 \rightarrow CoCO_3 + 2NaNO_3$$

The amount of sodium carbonate that is added to the filtrate is ordinarily sufficient to raise the pH level of the filtrate to about 8.5. At this pH level the cobalt carbonate precipitates readily, and it can be separated from the solution by filtration followed by water washing.

The following examples illustrate the preferred procedures for carrying out this invention.

*Example 1*

Into a glass-lined reactor was charged 75 gallons of water, 200 pounds dry weight reduced cobalt oxo catalyst and 583 pounds of 67 percent nitric acid. The acid was added very slowly as the reaction between the catalyst and acid is rather violent if it is added too rapidly. This catalyst contained 76 pounds of cobalt and 14 pounds of iron. This material was heated to 80–90° C. for four hours with good agitation. After the leach, the nitric acid percent was 8.9. After cooling down to 40° C., 125 pounds of soda ash was added to raise the pH to 5.4 causing the iron to precipitate as the basic nitrate. The soda ash was added in small portions as considerable foaming occurs if added too rapidly. The solution was heated to 80° C. and filtered after 5 hours. The residue was washed with water until the washings no longer contained a pink color, which amounted to three 25-gallon portions. The residue weighed 114 pounds and contained 2.4 pounds of cobalt and 15.8 pounds of iron. To the filtrate was added 203 pounds of soda ash to raise the pH to 8.5 thus causing the cobalt to precipitate as the carbonate. This material was filtered and the cobalt carbonate filtrate weighed 150 pounds and contained the equivalent of 72 pounds of cobalt and 0.5 pound of iron.

*Example 2*

Into a glass-lined reactor was charged 75 gallons of water, 300 pounds dry weight cobalt oxo catalyst and 900 pounds of 67 percent nitric acid added slowly. The catalyst contained 114 pounds of cobalt and 19 pounds of iron. This material was heated to 80–90° C. for 4 hours with good agitation. After cooling the hot solution, 193 pounds of soda ash was added in small quantities to raise the pH to 5.4 causing the iron to precipitate as the basic nitrate. The solution was heated and filtered and required only a short time for filtration. The residue was washed with two 25-gallon portions of water. The residue weighed 140 pounds and contained 1.5 pounds of cobalt and 17.5 pounds of iron. The pH of the filtrate was raised to 8.5 by adding 203 pounds of soda ash, thus causing the cobalt to precipitate as the carbonate. The solution was filtered and the solids weighed 235 pounds and contained the equivalent of 112 pounds of cobalt and 1.3 pounds of iron.

*Example 3*

The glass-lined reactor was charged with 79 gallons of water, 300 pounds of an oxidized cobalt oxo catalyst and 600 pounds of 67 percent nitric acid. The catalyst contained 60 pounds of cobalt and 12 pounds of iron. The reaction between the oxidized catalyst and the nitric acid is not nearly as violent as with the reduced catalyst, consequently it may be added more rapidly. The contents of the reactor were heated to 80–90° C. with good agitation for 4 hours. After cooling down to 40° C., 160 pounds of soda ash was added to raise the pH to 5.4, thus causing iron to precipitate from solution. The solution was then filtered. It required almost a week to filter this material using the same equipment as in Examples 1 and 2. After it finally filtered, it was washed until washings contained no pink color. The residue weighed 142 pounds and contained 10.5 pounds of cobalt and 9 pounds of iron. The cobalt was precipitated from the filtrate by adding soda ash slowly until a pH of 8.5 was reached. It required about 185 pounds of soda ash to reach this pH. This material filtered much faster than the first filtration. The solids weighed 110 pounds and contained 49 pounds of cobalt and 3 pounds of iron.

As a result of the practice of this invention it has been found that the separation of the iron from a contaminated cobalt oxo catalyst results in a substantial improvement in the quality of the aldehydes produced by the oxo reaction. The contaminating iron in the cobalt catalyst tends to form iron carbonyls as a result of the reaction of iron with carbon monoxide. The presence of the iron carbonyls in the cobalt catalyst can result in the production of an aldehyde having a color measured as high as 500 on the American Public Health Association Water Scale. On the other hand, after the iron has been removed from the cobalt catalyst in accordance with this invention the color of the aldehydes produced in a similar manner is reduced to less than 5 when measured on the same scale. Also the presence of the iron in the cobalt catalyst tends to lower the activity of the cobalt catalyst and the activity can be reduced to the point where only about 170 pounds and less of aldehyde product are formed per cubic foot of catalyst. After removal of the contaminating iron from the cobalt catalyst in accordance with this invention, the production of aldehydes can be increased to about 215 pounds and more of product per cubic foot of catalyst.

The cobalt catalysts employed in the oxo reaction are sometimes reduced with hydrogen prior to use in the reaction, but the cobalt catalysts can also be of the oxidized type. For this invention it is preferred to use the reduced type of catalyst, and with that type of catalyst this invention makes possible the recovery of substantially all the cobalt free of iron. However, the invention can also be used to recover cobalt from an oxidized type of catalyst.

The invention has been described in detail with particular reference to preferred embodiments thereof, but it will be understood that variations and modifications can be effected within the spirit and scope of the invention as described hereinabove and as defined in the appended claims.

We claim:

1. In a process for the hydroformylation of an olefinic compound with carbon monoxide and hydrogen in the presence of a cobalt hydroformylation catalyst wherein the hydroformylation reaction is conducted in the presence of iron-containing equipment and wherein the cobalt hydroformylation catalyst becomes contaminated with iron, the improvement for separating iron from said iron-contaminated cobalt hydroformylation catalyst which comprises digesting said iron-contaminated catalyst in nitric acid to convert iron and cobalt to corresponding nitrates, raising substantially the pH of resulting solution not above 5.4 wherein cobalt remains in solution and an iron-containing precipitate is formed and separating iron-containing precipitate from cobalt-containing solution.

2. In a process for the hydroformylation of an olefinic compound with carbon monoxide and hydrogen in the presence of a cobalt hydroformylation catalyst wherein the hydroformylation reaction is conducted in the presence of iron-containing equipment and wherein the cobalt hydroformylation catalyst becomes contaminated with iron, the improvement for separating iron from said iron-contaminated cobalt hydroformylation catalyst which comprises digesting said iron-contaminated catalyst in nitric acid to convert iron and cobalt to corresponding nitrates, adding an alkali metal carbonate to resulting solution in an amount sufficient to raise the pH of said solution to 2.8 to 3.2 whereby cobalt remains in solution and an iron-containing precipitate is formed and separating iron-containing precipitate from cobalt-containing solution.

3. The process according to claim 2 wherein sodium carbonate is the alkali metal carbonate.

4. In a process for the hydroformylation of an olefinic compound with carbon monoxide and hydrogen in the presence of a cobalt hydroformylation catalyst wherein the hydroformylation reaction is conducted in the presence of iron-containing equipment and wherein the cobalt hydroformylation catalyst becomes contaminated with iron, the improvement for separating iron from said iron-contaminated cobalt hydroformylation catalyst which comprises digesting said iron-contaminated catalyst in nitric acid to convert iron and cobalt to corresponding nitrates, adding sodium carbonate to resulting solution in an amount sufficient to raise the pH of said solution to 2.8 to 3.2 whereby cobalt remains in solution and an iron-containing precipitate is formed and filtering iron-containing precipitate from cobalt-containing solution at a temperature within the range of 50 to 100° C.

5. In a process for the hydroformylation of an olefinic compound with carbon monoxide and hydrogen in the presence of a cobalt hydroformylation catalyst wherein the hydroformylation reaction is conducted in the presence of iron-containing equipment and wherein the cobalt hydroformylation catalyst becomes contaminated with iron, the improvement for separating iron from said iron-contaminated cobalt hydroformylation catalyst which comprises digesting said iron-contaminated catalyst in nitric acid to convert iron and cobalt to corresponding nitrates, adding sodium carbonate to resulting solution in an amount sufficient to raise the pH of said solution to 2.8 to 3.2 whereby cobalt remains in solution and an iron-containing precipitate is formed, filtering iron-containing solution from cobalt-containing solution at a temperature within the range of 50 to 100° C. and raising the pH of cobalt-containing filtrate to a level not above 8.5 whereby a cobalt-containing precipitate is formed.

6. In a process for the hydroformylation of an olefinic compound with carbon monoxide and hydrogen in the presence of a cobalt hydroformylation catalyst wherein the hydroformylation reaction is conducted in the presence of iron-containing equipment and wherein the cobalt hydroformylation catalyst becomes contaminated with iron, the improvement for separating iron from said iron-contaminated cobalt hydroformylation catalyst which comprises digesting said iron-contaminated catalyst in nitric acid to convert iron and cobalt to corresponding nitrates, adding sodium carbonate to resulting solution in an amount sufficient to raise the pH of said solution to 2.8 to 3.2 whereby cobalt remains in solution and an iron-containing precipitate is formed, filtering iron-containing solution from cobalt-containing solution at a temperature within the range of 50 to 100° C. and adding sodium carbonate to cobalt-containing filtrate in an amount sufficient to raise the pH of said filtrate to about 8.5 whereby a cobalt carbonate precipitate is formed.

References Cited in the file of this patent

UNITED STATES PATENTS

| 2,215,885 | Roelen et al. | Sept. 24, 1940 |
| 2,232,527 | Hill | Feb. 18, 1941 |
| 2,867,503 | Roy | Jan. 6, 1959 |
| 2,963,514 | Rehn | Dec. 6, 1960 |

OTHER REFERENCES

Curtman, "Introduction to Semimicro Qualitative Chemical Analysis," revised edition, 1950, page 160.